United States Patent [19]

Rodaway

[11] 4,164,354

[45] Aug. 14, 1979

[54] NARROW FRAME WHEELCHAIR

[75] Inventor: Keith S. Rodaway, Santa Monica, Calif.

[73] Assignee: Everest & Jennings, Inc., Los Angeles, Calif.

[21] Appl. No.: 883,573

[22] Filed: Mar. 6, 1978

[51] Int. Cl.[2] .............................................. B62B 11/00

[52] U.S. Cl. ...................................... 280/42; 280/647; 297/DIG. 4

[58] Field of Search .................... 280/42, 647, 39, 650

[56] References Cited

U.S. PATENT DOCUMENTS

| | | | |
|---|---|---|---|
| 3,627,343 | 10/1968 | Meyer | 280/39 |
| 3,993,351 | 11/1976 | Rodaway | 297/DIG. 4 |
| 4,042,250 | 8/1977 | Rodaway | 280/42 |
| 4,065,180 | 12/1977 | Karay | 297/DIG. 4 |

*Primary Examiner*—Robert R. Song

*Attorney, Agent, or Firm*—Ralph B. Pastoriza

[57] ABSTRACT

A wheelchair frame is uniquely designed to permit folding of the chair in such a manner that the left and right wheels of the wheelchair lie in the same vertical planes as the left and right wheelchair frame portions supporting the seats and arm rests so that in effect a narrower folded configuration results for a given width wheelchair seat when in unfolded position as compared to conventional wheelchairs.

3 Claims, 4 Drawing Figures

NARROW FRAME WHEELCHAIR

This invention relates to wheelchairs and more particularly to a unique frame structure for a wheelchair resulting in a narrower frame configuration when in folded position for a given width seat than possible with conventional wheelchairs.

BACKGROUND OF THE INVENTION

Conventional wheelchairs of the folding type normally incorporate crossing tubes pivoted together at their cross-over points so that they can be scissored towards a vertical position to collapse the left and right frame tube sides together. The wheelchair seat and back rest are made generally of flexible canvas-like material which will simply fold when the left and right frame portions are brought together.

In folded configuration, the overall width is determined by the spacing of the wheels, generally the rear wheels of the wheelchair. The folded seat frame portions and so forth are accommodated within this width, the overall structure being such that the spacing between the seat support frame tubes and arm rest support frame tubes is always less than the spacing between the wheels in both unfolded and folded positions of the wheelchair.

As an example, for a conventional wheelchair with standard arm rests having a 16-inch seat width, the overall width between the rear wheels is $22\frac{5}{8}$ inches. In the case of a normal wheelchair of standard arms having an 18-inch seat width, the overall width of the rear wheels is $24\frac{5}{8}$ inches. There are certain environments having very narrow doorways or hallways which simply cannot conveniently accommodate a wheelchair having such overall width dimensions as measured between the rear wheels. Further, when the chairs are folded, even in their folded position the overall width for a given seat width is of such dimension as to render it difficult to accommodate the folded wheelchair in trunks of automobiles, particularly compact automobiles.

BRIEF DESCRIPTION OF THE PRESENT INVENTION

With the foregoing considerations in mind, the present invention contemplates a narrow frame wheelchair wherein the overall width between the wheels for a given seat width is substantially less than conventional chairs when in unfolded position and, similarly the width between the wheels when in folded position is substantially less for a given seat width than conventional wheelchairs all to the end that the wheelchairs of this invention can more easily be navigated through narrow doors and hallways.

More particularly, and with reference to the typical prior art seat and wheel dimensions given above, for a 16-inch seat width of the wheelchair of this invention, the overall width between the extreme left and right portions of the arm rest and wheels is no greater than 19 inches and for an 18-inch seat width this overall width between the extreme left and right portions of the arm rest is no greater than 21 inches. There is thus provided a decrease in the overall width of the wheelchair for given seat widths of $3\frac{5}{8}$ inches in the particular examples set forth.

Realization of the foregoing advantage in accord with this invention is accomplished, briefly, by a uniquely designed frame structure such that the left rear wheel and left front wheel are in the same vertical plane as the left seat support frame tube and the right rear wheel and right front wheel are in the same vertical plane as the right seat support frame tube. Further, the crossing tubes capable of being pivoted towards vertical positions in the folding operation have pivot means connected thereto in a manner such that the pivot point of the tubes takes place about a pivot axis spaced vertically above the tube cross-over point a given distance. This given distance is such that when the wheelchair is completely folded, lower horizontal frame tube portions are in actual physical engagement and the wheels still lie in the vertical planes of the seat support frame tubes and arm rest frame tubes for the left and right side of the wheelchair respectively. Essentially, the overall width of the chair is thus defined by the spacing between the arm rest and seat support tubes, this spacing corresponding essentially to the spacing between the wheels so that a maximum seat width is realized for a given overall width of the wheelchair frame in both folded and unfolded conditions.

BRIEF DESCRIPTION OF THE DRAWINGS

A better understanding of this invention will be had now referring to the accompanying drawings in which.

DETAILED DESCRIPTION OF THE PREFERRED EMBODIMENT

Figure 1:
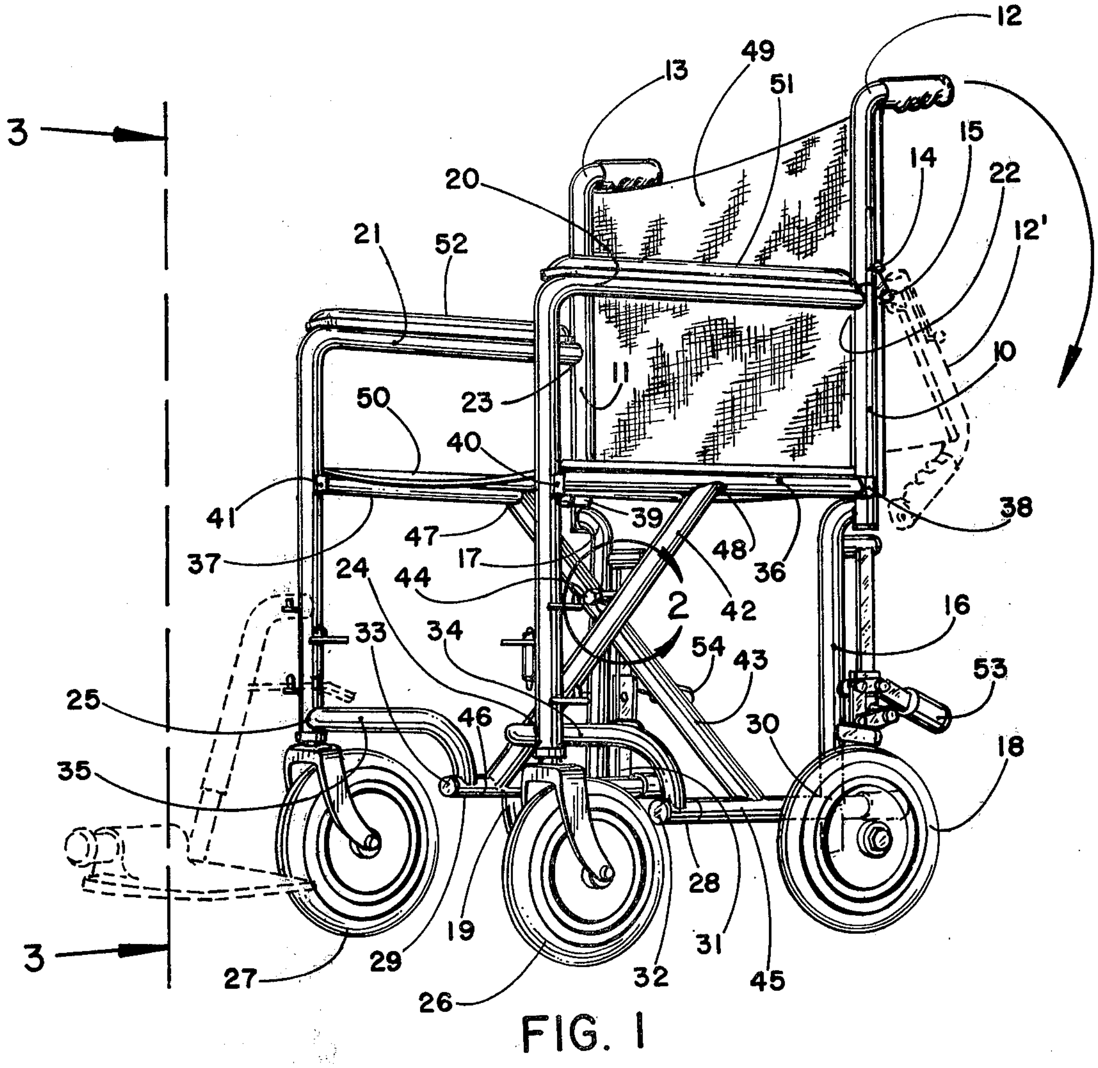
FIG. 1 is a perspective view of the narrow frame wheelchair of this invention in unfolded operative position.

Referring first to FIG. 1, the narrow frame wheelchair comprises essentially left and right back support tubes 10 and 11 terminating at their upper ends in left and right handle means 12 and 13 for guiding the wheelchair. Each of these handle means such as the handle means 12 includes an inner telescoping tube which may be raised by means of a pin 14 extending through a slot in the outer tube and a pivot structure 15 so that the handle means 12 can be folded downwardly to a dotted line position as indicated at 12'. This particular feature which is common to many wheechairs is desirable in the present wheelchair to decrease the overall height of the chair when in folded position for easy accommodation in an automobile back seat or trunk.

Referring to the rear lower portion of the chair of FIG. 1 there are provided left and right inwardly and downwardly turned rear wheel support tubes 16 and 17 secured at their upper ends to the lower end portions of the back support tubes 10 and 11 respectively.

Left and right rear wheels 18 and 19 are rotatably mounted on the lower ends of these rear wheel support tubes 16 and 17 as shown.

Referring to the central upper portion of FIG. 1, the frame further includes left and right arm rest support tubes 20 and 21 having first ends secured at intermediate portions of the back support tubes 10 and 11 as indicated at 22 and 23 respectively. These arm rest tubes extend forwardly as shown and thence downwardly to terminate in second ends 24 and 25.

Left and right caster wheels 26 and 27 are mounted to these second ends 24 and 25 as shown.

Still referring to FIG. 1, there are shown left and right lower horizontal frame tubes 28 and 29 secured at rear ends to the lower ends of the rear wheel support tubes 16 and 17 as at 30 and 31, the tubes 28 and 29 extending forwardly to terminate in forward ends 32 and 33. Left and right upwardly and outwardly extending frame tubes 34 and 35, in turn, connect these forward ends to the second ends 24 and 25 of the downwardly turned portions of the left and right arm rest support tubes.

Referring now to the upper central portion of the wheelchair of FIG. 1, there are shown left and right horizontal seat support frame tubes 36 and 37 disposed vertically below the forwardly extending portions of the left and right arm rest tubes 20 and 21, the opposite ends of the seat support tubes terminating in tube engaging guide elements such as indicated at 38, 39 and 40, 41, respectively. These guiding elements engage the back support tubes and downwardly extending portions of the arm rest tubes respectively so that the left and right horizontal seat support tubes 36 and 37 can glide upwardly to nesting positions under the forwardly extending portions of the arm rest support tubes 20 and 21.

The narrow frame structure is completed by the provision of first and second crossing tubes 42 and 43 having pivot means 44 pivoting the tubes at a given vertical distance above their cross-over point, all as will become clearer as the description proceeds. The lower ends of the crossing tubes terminate in journalling sleeves 45 and 46 receiving the left and right lower horizontal frame tubes 28 and 29 respectively. The upper ends of these crossing tubes, in turn, are connected directly as at 47 and 48, respectively, to the right and left horizontal seat support frame tubes 37 and 36. Any other structure providing an equivalent function of the journalling tubes could be used to couple the ends of these crossing tubes to the various frame tubes as described.

Figure 2:
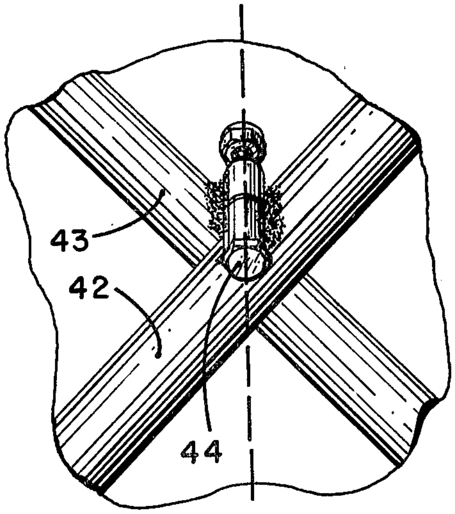
FIG. 2 is a greatly enlarged perspective fragmentary view of a portion of the frame structure enclosed within the circular arrow 2 of FIG. 1.

FIG. 2 shows in enlarged fragmentary view the pivot means 44 for the crossing tubes 42 and 43 wherein it will be evident that the pivot axis is disposed vertically above the cross over point of these tubes.

Figure 3:
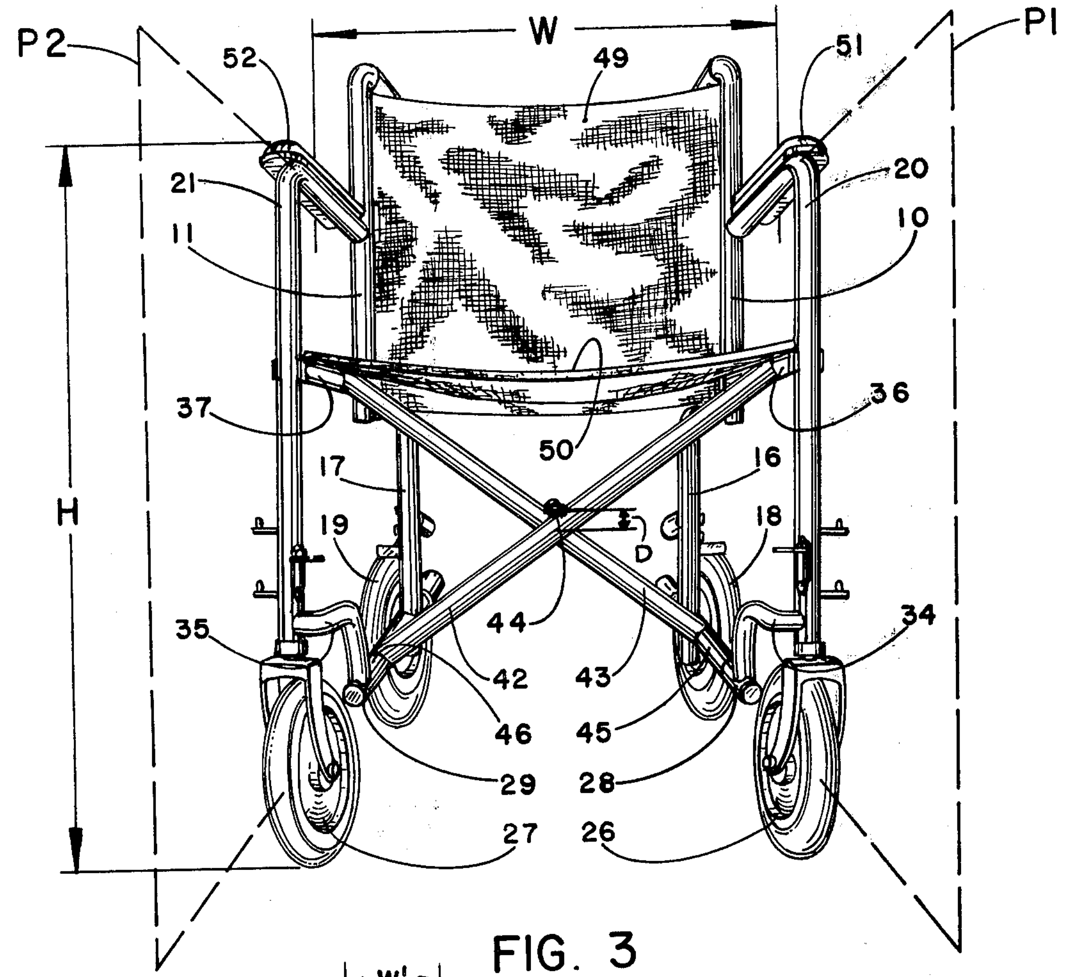
FIG. 3 is a full front elevational view of the wheelchair in unfolded position; and, FIG. 4 is a view similar to FIG. 3 but showing the wheelchair in collapsed or folded position.

FIG. 3 shows the wheelchair of FIG. 1 in full front elevational view in completely unfolded, usable condition. In FIG. 3, the various components are designated by the same numerals utilized in FIG. 1. The given vertical distance of positioning of the pivot axis for the pivot means 44 above the cross-over point of the crossing tubes 42 and 43 is clearly indicated in FIG. 3 by the letter D.

It will also be evident from FIG. 3 that the inturned extent of the wheel support frame tubes 16 and 17 and the outwardly turned extent of the frame tubes 34 and 35 connecting to the lower ends of the arm rest support tubes 20 and 21 are such that the left rear and left front wheels 18 and 26 are in the same vertical plane as the left seat support tube 36 and forwardly extending portion of the arm rest tube 20, this vertical plane being depicted by the dashed line P1. Similarly, the right rear wheel 19 and right front wheel 27 lie in the same vertical plane as the right seat support tube 37 and forwardly extending portion of the right arm rest tube 21, this second vertical plane being designated P2.

The effective overall width of the seat thus corresponds essentially to the spacing between the rear wheels and the spacing between the front wheels as well as the spacing between the arm rests, this overall width being indicated at W.

Figure 4:
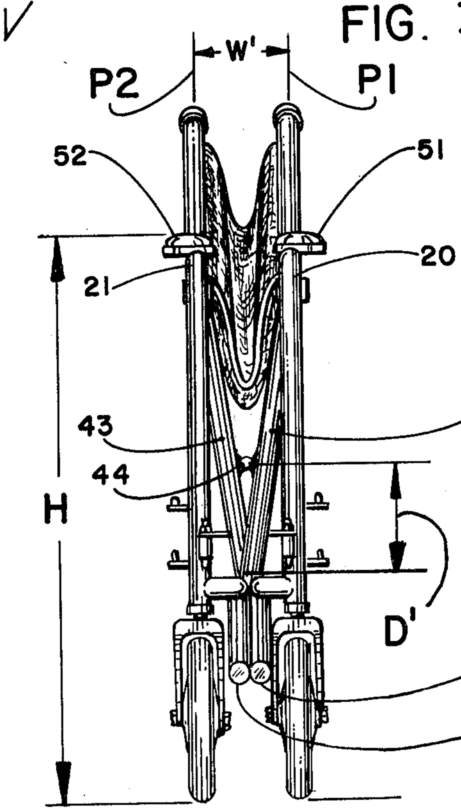

Referring now to FIG. 4, there is illustrated a similar view of the chair as shown in FIG. 3 but in completely folded position. Again, identical numbers have been used to designate corresponding parts in FIG. 4. The positioning of the pivot means 44 for the crossing tubes 42 and 43 as designated by the letter D in FIG. 3 is such that the left and right frame sides of the chair can be collapsed together to a minimum extent limited by the actual side-by-side engagement of the lower horizontal left and right frame tubes 28 and 29. In this respect, it will be noted in FIG. 4 that the vertical distance of the pivot means 44 from the now newly defined crossing point of the crossing tubes 42 and 43 has increased as indicated at D'. The dimensioning and arrangement is such that the forwardly extending portions of the arm rest support tubes 20 and 21 as well as the left and right seat support tubes 36 and 37 are still in a vertical plane with the left rear and left front wheels and right rear and right front wheels of the chair respectively, the two vertical planes again being designated P1 and P2. The folded width of the wheelchair is effectively measured between these vertical planes and in FIG. 4 is indicated at W'.

From all of the foregoing, it will be evident that the separation distance of the rear and front wheels is no greater than the separation distance of the arm rest tubes when the wheelchair is folded as well as when the wheelchair is open. There is thus provided a minimum width for the wheelchair in folded position for a given width seat when in unfolded position, this width when in folded position being less than that of a standard wheelchair of given seat width in unfolded position.

In storing the wheelchair in the trunk of an automobile, for example, the handle means 12 and 13 described in FIG. 1 would be folded down to the dotted line position so that not only will a narrower width result when the chair is folded but a shorter overall height. In this latter respect, the height of the chair is measured between the wheels and the arm rests as indicated by the letter H in FIG. 3. It will be evident that this height is not increased when folding the chair, the seat support frame tubes simply sliding upwardly to nest under the arm rest structures 51 and 52 as described and shown in FIG. 4.

While a specific embodiment of the invention has been set forth and described, it should be understood that the frame tubes need only be designed in such manner as to assure that no portions of the wheelchair extend beyond the width of the seat in either unfolded or folded position. Such design will automatically provide for a wheelchair with a desired given seat width capable of being maneuvered through narrow entries and hallways more expeditiously than conventionally known wheelchairs of similar seat width.

I claim:

1. A narrow frame wheelchair having a seat, left rear and front wheels and right rear and front wheels, including in combination:

(a) left and right seat support frame tubes defining therebetween the width of said seat when said wheelchair is in unfolded position;

(b) left and right lower frame tube means connected between the left rear and front wheels and right rear and front wheels respectively, such that the left rear wheel and left front wheel are in the same vertical plane as the left seat support tube and the right rear wheel and right front wheel are in the same vertical plane as the right seat support frame tube;

(c) first and second crossing tubes having their opposite ends respectively connected to the left lower frame tube means and right seat support frame tube and the right lower frame tube means and left seat support tube; and (d) pivot means connected to said crossing tubes to pivot the tubes about a pivot axis spaced vertically above the cross-over point of said tubes a given distance, said given distance being such that said crossing tubes can be pivoted towards a vertical parallel relationship by moving said seat support frame tubes towards each other and lower frame tube means simultaneously towards each other until said lower frame tube means are in side-by-side engaging relationship to fold said wheelchair, and whereby said left rear and left front wheels are still in the same vertical plane as said left seat support tube and said right rear and right front wheels are still in the same vertical plane at said right seat support tube when said wheelchair is folded to result in a minimum overall width for the folded wheelchair for a given seat width when the wheelchair is unfolded.

2. A narrow frame wheelchair having left rear and front wheels and right rear and front wheels, including in combination:

(a) left and right parallel horizontal seat support tubes;

(b) left and right lower frame tube means connected between the left rear and front wheels and the right rear and front wheels respectively, intermediate lengths of said tube means being parallel and spaced inwardly a distance such that the left rear wheel and left front wheel are in the same vertical plane as the left seat support tube and the right rear wheel and right front wheel are in the same vertical plane as the right seat support tube; and (c) first and second crossing tubes having pivot means pivoting the tubes at a point spaced a given vertical distance above the cross-over point of said crossing tubes, said crossing tubes having lower ends terminating in journalling sleeves receiving said left and right intermediate lengths of said lower horizontal frame tube means respectively and their upper ends connecting to said right and left seat support tubes respectively, said given vertical distance of pivoting of said crossing tubes being such that said crossing tubes can be pivoted towards a vertical parallel relationship by moving said seat support frame tubes towards each other and lower frame tube means simultaneously towards each other until said intermediate lengths of said lower frame tube means are in side-by-side engaging relationship, and whereby said left rear and left front wheels are still in the same vertical plane as said left seat support tube and said right rear and right front wheels are still in the same vertical plane as said right seat support tube when said wheelchair is folded to result in a minimum overall width for the folded wheelchair for a given seat width when the wheelchair is unfolded.

3. A narrow frame wheelchair including, in combination:

(a) left and right vertical back support tubes terminating at their upper ends in left and right handle means for guiding the wheelchair;

(b) left and right inwardly and downwardly turned rear wheel support tubes secured at their upper ends to the lower end portions of said back support tubes respectively;

(c) left and right rear wheels rotatably mounted on the outer lower ends of said rear wheel support tubes;

(d) left and right arm rest support tubes having first ends secured at intermediate portions of said back support tubes, said arm rest tubes extending forwardly and thence downwardly to terminate in second ends;

(e) left and right caster wheels mounted to said second ends of said arm rest tubes;

(f) left and right lower horizontal frame tubes secured at rear ends to said lower ends of said rear wheel support tubes and extending forwardly to terminate in forward ends;

(g) left and right upwardly and outwardly extending frame tubes connecting said forward ends of said lower left and right horizontal frame tubes to said second ends of said left and right arm rest support tubes;

(h) left and right horizontal seat support frame tubes disposed vertically below the forwardly extending portions of said left and right arm rest tubes respectively, opposite ends of said horizontal seat suuport frame tubes terminating in tube engaging guide elements engaging said back support tubes and downwardly extending portions of said arm rest tubes, respectively, so that said left and right horizontal seat support tubes can glide upwardly to nesting positions under the forwardly extending portions of said arm rest support tubes; and (i) first and second crossing tubes having pivot means pivoting the tubes at a given vertical distance above their cross-over point, the lower ends of said crossing tubes terminating in journalling sleeves receiving said left and right lower horizontal frame tubes respectively and the upper ends of said crossing tubes connecting to said right and left horizontal seat support frame tubes, respectively whereby folding of said wheelchair is accomplished by pivoting said crossing tubes in directions towards vertical parallel positions, the folding being completed when said left and right lower horizontal frame tubes are in touching side-by-side relationship, the inwardly turned extent of said rear wheel support tubes and the outwardly turned extent of said frame tube connecting to the forward ends of said lower left and right horizontal frame tubes and the given vertical distance of the pivoting of said crossing tubes above the crossing point of said tubes all being such that the left rear wheel and left front wheel, left arm rest support tube and left seat support tube all lie in the same vertical plane and such that the right rear wheel and right front wheel and right arm rest support tube and right seat support tube all lie in the same vertical plane so that the separation distance of the rear wheels and the separation distance of the front wheels is no greater than the separation distance between said arm rest tubes and the separation distance of said seat support tubes when said wheelchair is folded to thereby provide a minimum width for said wheelchair in folded position for a given width of the seat when in unfolded position.

* * * * *